Sept. 28, 1965    E. PHILLIPS    3,208,643
APPARATUS TO DISCHARGE FOOD MATERIAL
Filed Feb. 14, 1963    2 Sheets-Sheet 1
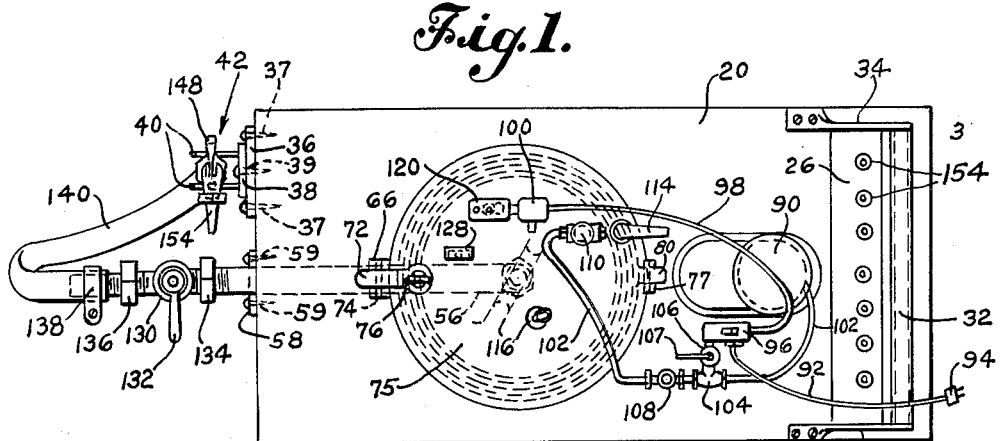
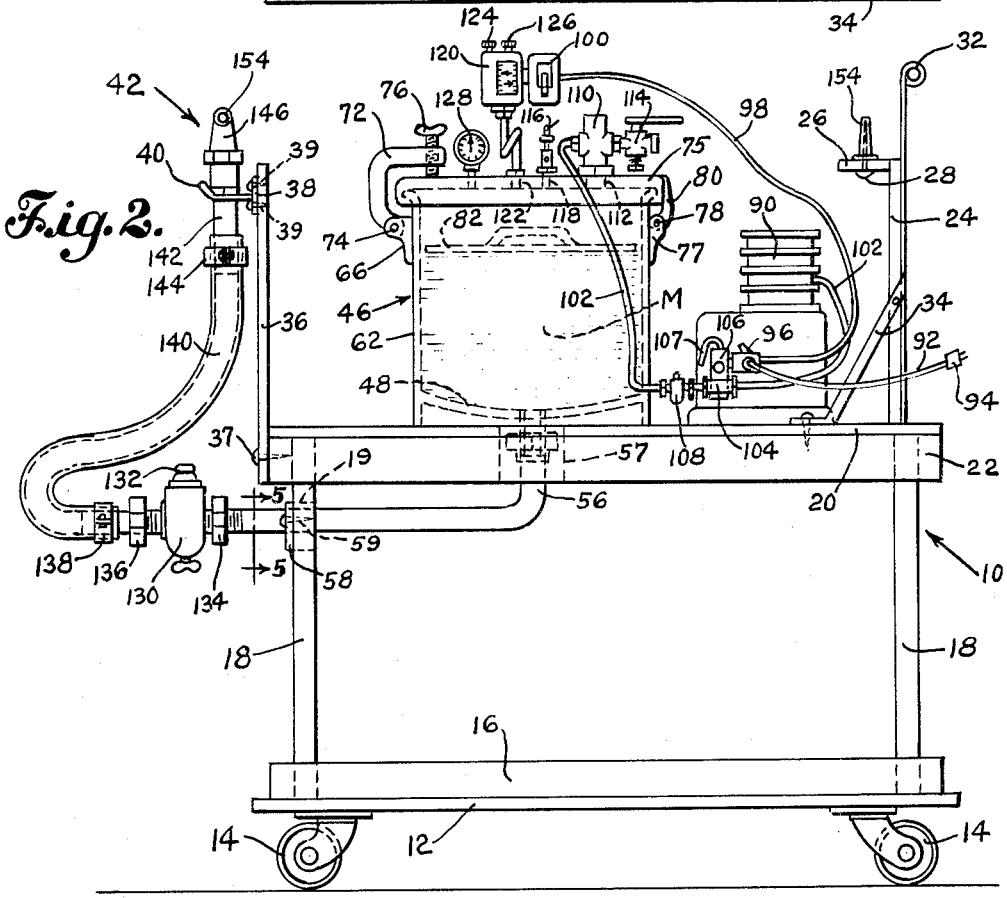
INVENTOR.
Edward Phillips
BY Harold E. Cole
Attorney Sept. 28, 1965   E. PHILLIPS   3,208,643
APPARATUS TO DISCHARGE FOOD MATERIAL
Filed Feb. 14, 1963   2 Sheets-Sheet 2

INVENTOR.
Edward Phillips
BY Harold E. Cole
Attorney

United States Patent Office 3,208,643
Patented Sept. 28, 1965

3,208,643
APPARATUS TO DISCHARGE FOOD MATERIAL
Edward Phillips, 23 Bradford Road, Natick, Mass.
Filed Feb. 14, 1963, Ser. No. 258,537
5 Claims. (Cl. 222—176)

This invention relates to apparatus to discharge food material, especially viscous or non-flowing, aerated material such as frosting, whipped cream and the like.

A common practice in bakeries is to apply frosting to mocha slices and cakes, and whipped cream to shells or puffs, by means of a bag or tube that is squeezed by hand. This requires considerable physical hand pressure which slows production, and also the bag or tube has to be frequently filled since its cubic capacity is very limited.

Accordingly one object of my invention is to provide such apparatus that utilizes air pressure to force the material through discharge means to articles such as cakes, food shells and other bakery products, using a receptacle that will contain a very large quantity of the material.

Another object is to provide a receptacle for said material within which is a pressure plate so positioned that it will move freely downward within the receptacle when air pressure is supplied above it.

A further object is to provide a receptacle having means to regulate air pressure delivered to it and means to controllably discharge said material that is under said air pressure.

The foregoing and other objects which will appear as the nature of the invention is better understood, may be accomplished by a construction, combination and arrangement of parts such as is disclosed by the drawings. The nature of the invention is such as to render it susceptible to various changes and modifications, and therefore, I am not to be limited to the construction disclosed by the drawings nor to the particular parts described in the specification; but am entitled to all such changes therefrom as fall within the scope of my claims.

In the drawings:

FIG. 1 is a top plan view of my apparatus to discharge food material.

FIG. 2 is a side elevational view thereof.

Figure 3:
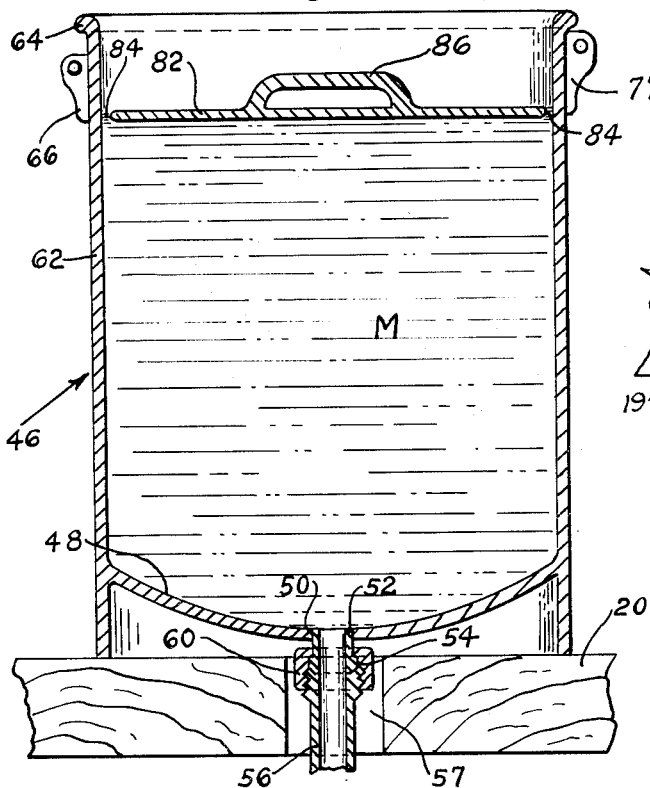
FIG. 3 is an enlarged, longitudinal, sectional view of a receptacle to hold food material, that forms part of my apparatus, its cover being omitted.
Figure 5:
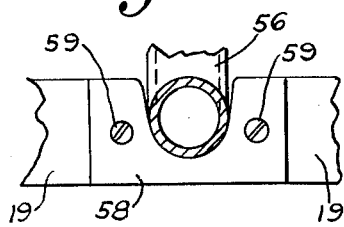
FIG. 5 is an enlarged, sectional view taken on the line 5—5 of FIG. 2.
Figure 4:
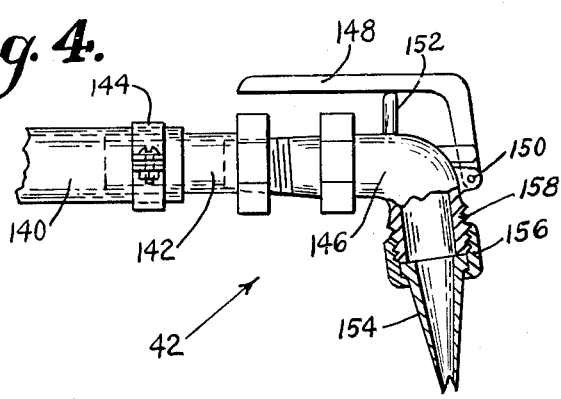
FIG. 4 is a fragmentary, side elevational view showing the means to discharge food material, partly in section.

As illustrated, I provide carriage 10 for my apparatus that has a base 12 on casters 14. Joiners 16 extend between four uprights or legs 18 which are attached to said base. A brace 19 extends between two of said uprights 18 for a purpose later described. A top 20 for said carriage is shown as made of wood and there are joiners 22 between said uprights 18 adjacent said top. A supporting bracket 24 supports a shelf 26 in which pins 28 project upwardly to receive nozzles 154 later described. Different kinds of nozzles are used with my apparatus depending upon the kind of work to be done. A handle 32 is attached to said carriage 10 for pushing it, and it is supported by brackets 34 that are attached to bracket 24 and to said top 20.

An upright support 36 is fastened to joiners 22 by screws 37. A bracket 38, attached to said support 36 by screws 39, has prongs 40 to hold a material discharge means 42 later described. While I find a carriage convenient as a support and to make my apparatus portable, it is not indispensable since a table, stand or other means of support could serve my purpose.

A receptacle or tank 46 to hold frosting, whipped cream, or similar non-flowing aerated material has a concave bottom 48 having an opening 50 therethrough to receive a conduit neck 52 which has a shoulder 54. A metal conduit 56 that is exteriorly screw-threaded, communicates with said conduit neck 52 and extends through a hole 57 in said top 20, being supported by a bracket 58 held by screws 59 to said brace 19. A nut 60 bears on said shoulder 54 and screw-threadedly engages said metal conduit 56 to hold the latter to said neck conduit 52.

Said receptacle 46 has a side 62 formed with a bead 64 at the top. A hinge 66 attached to said side 62 receives a pin 74 that holds an angle clamp 72 which extends to a position over a closure or cover 75 included with said receptacle. A thumb screw 76 screw-threadedly extends through said clamp 72 and presses firmly on said cover 75 when it is tightened. Another hinge 77 attached to said side 62 is connected by a pin 78 to a hinge 80 attached to said cover.

A pressure plate 82, of a similar shape in cross section, to that of the interior of said receptacle, and which may be made of metal, such as aluminum, rests on frosting or other material M in said receptacle. Said plate 82 is spaced, as at 84, from the receptacle side 62 so that some lateral movement of it within said receptacle is possible, thus permitting it free movement downwardly. The frosting, whipped cream or other material in the tank fills said space 84 and thus seals the receptacle at the side of and below said pressure plate 82. The latter has a handle 86.

In a receptacle having an interior diameter of 13½ inches I have found that if said space 84 measures ⅛ to ¼ inch good results are achieved. This space should be such that no lubricant need be employed and desirably should be at least equal to 1/25 of the interior diameter of the receptacle which permits some definitely noticeable lateral movement of the plate 82 within the receptacle and allows for escape of any air about the material M.

An air compressor 90 is shown resting on said top 20 and electrical current is supplied to it by an electric line 92 having an electric plug 94 adapted to connect with a source of electric power not shown. A switch 96 connects with an electric line 98 that is also controlled by a switch 100. A conduit 102 for air communicates with a T-coupling 104 to which a compressor unloader solenoid 106 communicates, the latter having a bleeder tube 107. Said conduit 102 has a check valve 108.

Said receptacle mover 75 communicates with a well-known manifold 110 that communicates with conduit 102 and which is screw-threadedly connected to said cover 70 by a screw-threaded hole 112 in the latter. A hand valve 114 to evacuate the air in said receptacle is connected to said manifold 110, or it may be connected directly to said cover. A well-known safety valve 116 is screw-threadedly connected to said cover.

A pressure regulator 120 that is electrically operated is connected to said switch 100 and it is screw-threadedly connected by a hole 122 in said cover 75. A thumb nut 124 on said pressure regulator 12 may, upon being set, determine the maximum air pressure that can be established in said receptacle before the air pressure is automatically shut off. Likewise a thumb nut 126 thereon may, upon being set, determine the minimum that the air pressure may fall to before the air under pressure once again flows to said receptacle 46. The usual air pressure gauge 128 is connected to said cover from which a pressure reading is obtained.

Said metal conduit 56 has a well-known hand valve 130 controlled by movement of a handle 132, and is connected to said conduit 56 by a nut 134. A coupling 136 is connected to said valve 130 and a steel clamp 138 fastens said coupling so that it communicates with a flexible conduit 140 through which material is discharged. If desired a second discharge conduit could be used with valve 130. Another coupling 142 is connected by a steel clamp 144 so as to communicate with discharge means 42 to control the discharge of material M, having a well-known nozzle valve 146, the latter being screw-threaded into said coupling 142. Said nozzle valve 146 has a handle 148, pivotally fastened thereto by a pin 150. A plunger 152 enters said valve 146 being controlled by a handle 148 so as to determine the amount of material passing through valve 146.

A discharge nozzle 154 through which the material M passes out of my apparatus communicates with said valve 146 by means of a nut 156 that connects with screw-threads 158 on said valve 146. Various discharge nozzles 154 may be used, depending upon the size and shape of the stream of material it is desired to use in frosting a cake, piece of jelly roll, pie and the like.

When said receptacle 46 is filled with material M, such as whipped cream, frosting and the like, the pressure plate 82 is placed on top of the material, forcing out any air about the material through the space 84 and the latter soon fills with said material, thus sealing the upper portion of the receptacle above the pressure plate from the portion below it. When air enters the receptacle from above, it is applied to said plate and the material in said space 84, thereby forcing material to enter said discharge conduit 56 and out the nozzle 154 under fine control by the valve 146.

While my apparatus is intended particularly to discharge, under fine control, such material as frosting, whipped cream and other similar materials, it may also serve to discharge material that forms macaroon cookies, eclair-shells, whipped-cream shells and the like. It is suitable to discharge, under fine control, viscous materials of many kinds that require pressure, such as air pressure, to force them out of a conduit or other enclosure.

What I claim is:

1. Apparatus to discharge non-flowing, aerated, food material, in combination with a portable carriage supporting said apparatus and comprising a receptacle to hold said material having a cover, a pressure plate in said receptacle, means to apply air under pressure to said receptacle through said cover and above said pressure plate, and a discharge conduit in communication with said receptacle having means to controllably discharge said material.

2. Apparatus to discharge non-flowing, aerated, food material in combination with a portable carriage supporting said apparatus, as set forth in claim 1, said means embodying a compressor mounted on said carriage.

3. Apparatus to discharge non-flowing, aerated, food material in combination with a portable carriage supporting said apparatus, as set forth in claim 1, and a holder attached to said carriage normally holding and supporting said conduit.

4. Apparatus to discharge non-flowing, aerated, food material, comprising a receptacle to hold said material having a cover, a clamp attached to said receptacle and bearing on and closing said cover in position of use, a pressure plate in said receptacle, means to supply air under pressure to said receptacle through said cover and above said pressure plate, and a discharge conduit in communication with said receptacle having means to controllably discharge said material.

5. Apparatus to discharge non-flowing, aerated, food material in combination with a portable carriage supporting said apparatus, as set forth in claim 1, said pressure plate being spaced laterally from the interior side surface of said receptacle at the upper half thereof.

References Cited by the Examiner

UNITED STATES PATENTS

| 1,241,725 | 10/17 | Emigh | 184—39 |
| 1,545,379 | 7/25 | Winkley | 222—389 |
| 1,964,866 | 7/34 | Watson | 184—39 X |
| 2,148,767 | 2/39 | McGlade | 222—389 |
| 2,802,648 | 8/57 | Christensen et al. | 222—389 X |

FOREIGN PATENTS 334,981  1/36  Italy.

LOUIS J. DEMBO, *Primary Examiner.*

RAPHAEL M. LUPO, *Examiner.*